(12) United States Patent
Papoulis

(10) Patent No.: US 11,980,982 B1
(45) Date of Patent: May 14, 2024

(54) UPRIGHT VISE AND METHOD OF REPAIRING A LIQUID PAINT DISPLACEMENT PUMP

(71) Applicant: John Papoulis, Arlington Heights, IL (US)

(72) Inventor: John Papoulis, Arlington Heights, IL (US)

( * ) Notice: Subject to any disclaimer, the term of this patent is extended or adjusted under 35 U.S.C. 154(b) by 0 days.

(21) Appl. No.: 18/506,228

(22) Filed: Nov. 10, 2023

(51) Int. Cl.
  *B25H 1/04* (2006.01)
  *B23P 6/02* (2006.01)
(52) U.S. Cl.
  CPC . *B23P 6/02* (2013.01); *B25H 1/04* (2013.01)
(58) Field of Classification Search
  CPC .................................... B23P 6/06; B25H 1/04
  See application file for complete search history.

(56) References Cited

U.S. PATENT DOCUMENTS

| | | | | |
|---|---|---|---|---|
| 4,923,341 A * | 5/1990 | Cameron | ............... | B25F 3/00 |
| | | | | 408/112 |
| 6,189,458 B1 * | 2/2001 | Rivera | ............... | B60R 11/00 |
| | | | | 108/150 |
| 6,336,413 B1 * | 1/2002 | Ball | ............... | B60R 9/06 |
| | | | | 224/521 |
| 2002/0113407 A1 | 8/2002 | Spears | | |
| 2006/0162621 A1 | 7/2006 | Fisher | | |
| 2012/0211302 A1 | 8/2012 | Stewart | | |
| 2017/0282811 A1 | 10/2017 | Horn | | |
| 2022/0305622 A1 | 9/2022 | Vallad | | |

FOREIGN PATENT DOCUMENTS

| | | |
|---|---|---|
| CN | 203390917 U | 1/2014 |
| CN | 207509124 U | 6/2018 |
| CN | 208117776 U | 11/2018 |
| CN | 208496794 U | 2/2019 |
| CN | 208713828 U | 4/2019 |
| CN | 209190717 U | 8/2019 |
| CN | 209737524 U | 12/2019 |
| CN | 209737579 U | 12/2019 |
| CN | 209999080 U | 1/2020 |
| CN | 212601695 U | 2/2021 |
| CN | 213731593 U | 7/2021 |
| GB | 2110155 A | 6/1983 |

OTHER PUBLICATIONS

Polyhitch Modular Utility Products; https://contest.techbriefs.com/2015/entries/automotive-transportation/5863.

* cited by examiner

*Primary Examiner* — Nirvana Deonauth
(74) *Attorney, Agent, or Firm* — Lesley A. Wallerstein, LLC

(57) ABSTRACT

An upright vise supports and stabilizes a liquid paint displacement pump so that an individual technician on the road can safely, quickly, accurately, and securely open the pump, removed damaged piston packings from within the pump, replace with new piston packings and close the pump. A clever two-part locking and stabilizing mechanism secures the pump in an upright position to permit the technician to replace worn or defective piston packings using only an ordinary torque wrench.

3 Claims, 9 Drawing Sheets

UPRIGHT VISE AND METHOD OF REPAIRING A LIQUID PAINT DISPLACEMENT PUMP

CROSS-REFERENCE TO RELATED APPLICATIONS

Not applicable.

FEDERALLY SPONSORED RESEARCH AND DEVELOPMENT

Not applicable.

PARTIES TO A JOINT RESEARCH AGREEMENT

Not applicable.

SEQUENCE LISTING OR COMPUTER PROGRAM LISTING

Not applicable.

PRIOR DISCLOSURES BY THE INVENTOR OR JOINT INVENTOR

Not applicable.

BACKGROUND OF THE INVENTION

The invention is directed to improvements in upright vises and to methods for an individual to use such an upright vise to quickly, and safely, repair liquid paint displacement pumps on the road, without access to a dedicated repair workshop and using only a basic torque wrench.

BRIEF SUMMARY OF THE INVENTION

An upright vise supports and stabilizes a liquid paint displacement pump so that an individual technician on the road can safely, quickly, accurately, and securely open the pump, removed damaged piston packings from within the pump, replace with new piston packings and securely close the pump. A clever two-part locking and stabilizing mechanism secures the pump in an uprigth position to permit an individual technician to replace worn or defective piston packings using only an ordinary torque wrench.

Road striping trucks use heavy-duty liquid displacement pumps to spray traffic paint on pavement in a variety of colors and patterns. Imagine a can of spray paint you can buy at the hardware store but enlarged to 80 pounds and pointed toward the ground. This is how roads get marked. The pumps come in multiple sizes. All include a displacement rod and piston dimensioned to snugly fit within a cylindrical housing. A group of O-rings called piston packings, seal the piston against the interior of the cylindrical housing to create a vacuum. A packing nut encloses the rod and piston from above. Six longitudinal cap screws that run the length of the housing secure the packing nut onto the housing, forming a kind of cage around the rod, piston and piston packings.

To operate the pump, the rod and piston cycle up and down, within the housing. Drawing the rod and piston up creates a vacuum within the housing, thereby drawing liquid into the housing. Pushing the rod and piston in the opposite direction pushes liquid out an opposite side. The seal the piston makes against the cylinder is critical to creating and maintaining the vacuum. Over time, the repeated up and down motion erodes the packing. Eventually the O-rings no longer make a seal, and the pump begins to leak, or worse, stop spraying paint. The breakdown may happen when the paint truck is near a repair station and equipment, but it may also happen when the paint truck is remote. Because the damaged piston packings are buried deep within this cage, they must be extracted. This is a painstaking and deceptively delicate process. The repair technician must take extreme care both in opening and in closing the pump, so as not to damage its cooperating parts.

The leading liquid paint displacement pump manufacturers prescribe a method of repairing these pumps. This requires access to a dedicated repair facility, specialized tools and, because of the pump's weight, multiple people. Repair facilities, which have dedicated tables and vises which can support an 80-pound pump, are difficult to find, and not always convenient. The truck driver must usually stop their work and drive to a repair station. This costs time, energy, and money.

To solve this problem, I have invented a mobile repair platform that connects to, and is supported by, a conventional pickup truck receiver hitch. The platform is a rigid high strength steel with a plurality of circular openings cut therefrom. A first circular opening is specifically dimensioned to support and stabilize a standard pump housing in an upright position in an upright vise while a technician applies torque to open and close the housing. A spaced-apart second circular opening is specifically dimensioned to separate, support, and stabilize other parts of the pump, or pumps of nonstandard dimensions. The second circular opening may be reinforced with a rigid piece with a cutout, to further stabilize and strengthen the opening. A spaced-apart yet third circular opening supports and stabilizes yet other nonstandard sized pumps in an upright position.

The upright vise takes advantage of a unique feature of these liquid paint displacement pumps. The pump's piston has a bottom called a seat. The piston seat housing is generally circular in shape, except for two exterior and diametrically opposing flats. The piston seat housing is usually buried within the pump's main cylindrical housing, but it can be pushed out of the pump to be visible. These two flats, when exposed, form a sort of key. I have created a unique "keyhole" to mate with these keys to lock the piston seat housing thereupon. While the piston seat housing (bottom) is so locked, the technician can apply torque to the displacement rod and unscrew it from the piston and the piston packings.

Specifically, the upright vise comprises a rigid hollow cylindrical column, dimensioned to snugly fit around, surround, and thereby, support the pump housing in an upright position. In use, the cylindrical pump housing sits inside the cylinder of the vise. The column is open at the top and the bottom. The open bottom of the cylindrical column is welded to a rigid and flat first reinforcement piece with a central circular opening further defined by two diametrically opposed interior flats. The central circular opening is smaller than the diameter of the cylinder. Joining the cylinder to the first reinforcement piece in this way forms an annular lip in the interior space of the cylinder and a flange extending outward. These interior flats mate with the exterior flats of the piston seat housing, forming a sort of keyhole that accepts the "key" when it is inserted therein. Turning the piston seat housing within the cylindrical housing "locks" the exterior flats to the corresponding interior flats. This locking mechanism allows the technician to unscrew any other pump parts not otherwise locked. The simple two-part vise can be selectively fastened to the platform using ordinary fasteners such as nuts and bolts.

Some pump housings come in smaller than standard diameters. For repairing these pumps, I employ a lower adaptor ring, which has the same set of exterior flats as a standard pump on a lower face, and a corresponding set of interior flats on an upper face. The interior flats of the lower adaptor ring mate with the exterior flats of the smaller than standard diameter pump housing. This enables the technician to securely lock a smaller than standard pump housing into the upright vise.

When repairing either the standard or the smaller than standard diameter pump housing, lowering the pump housing into the vise, piston seat housing down, and displacement rod facing up creates an annular space between the displacement rod and the hollow cylindrical column of the vise. Applying torque on the displacement rod in this situation causes the piston packings (which are not visible at this stage) to rub against the cylindrical column in an uneven way, damaging and scratching the packings. To solve this problem, I created an upper centering ring. The upper centering ring fills this annular space and prevents the displacement rod from shifting laterally. With the upper centering ring in place, a technician can evenly apply torque.

In some aspects, I describe an upright vise having: a rigid hollow cylindrical column having an interior diameter, defining an interior space, and having an upper opening, and a lower opening. The upright vise further includes a rigid and flat first reinforcement piece with a central circular opening further defined by two diametrically opposed interior flats, the central circular opening being smaller than the lower opening of the cylindrical column, the reinforcement piece mounted beneath and centered about the lower opening of the cylindrical column, thereby creating an annular lip facing the interior space of the cylindrical column, and a flange extending away from the cylindrical column. The flange further includes a first plurality of fastener openings evenly spaced around the central circular opening.

The upright vise further includes an upper centering ring built in two parts: an upper, wider, hollow cylinder having an interior diameter and defining an interior space, which is then centrally mounted to a lower, narrower hollow cylinder of the same interior diameter.

The upright vise is mounted to a rigid platform notably having: (i) a first circular opening larger than the interior diameter of the hollow cylinder and a plurality of fastener opening evenly spaced therearound and aligned with the corresponding first plurality of fastener openings; (ii) a second circular opening reinforced with a second reinforcement piece and further defined by a central octagonal cutout larger than the second circular opening, and a second group of fastener openings evenly spaced around the octagonal cutout; (iii) a third circular opening smaller than both the first circular opening and the second circular opening and a third group of fastener openings spaced therearound; and (e) means to fasten the flange to the platform.

In additional aspects, the upright vise also includes at least one lower adaptor ring dimensioned to fit inside the hollow cylindrical column and having two diametrically opposed exterior flats dimensioned to mate with the two diametrically opposed interior flats of the hollow cylindrical column carved out from a bottom portion thereof. The lower adaptor ring is dimensioned to allow pumps with a smaller than standard piston seat housing to sit snugly and lock inside the vise.

In yet additional aspects, I describe a method of repairing damaged piston packings of a liquid paint displacement pump having a cylindrical housing and a piston seat housing with diametrically opposed exterior flats, broadly including the steps of: a) extracting from within the cylindrical housing a displacement rod, which is attached to the damaged piston packings, which is in turn attached to the piston seat housing; b) separating the displacement rod from the damaged piston packings and the piston seat housing, thereby exposing the damaged piston packings; (c) removing the damaged piston packings and the piston seat housing from within the vise; (d) removing the damaged piston packings from within the piston seat housing; (e) inserting new piston packings into the piston seat housing (f) pushing the new piston packings further into the piston seat housing to expose the exterior flats, aligning the piston seat housing exterior flats against the corresponding interior flats; (g) inserting the new piston packings and the piston seat housing back into the upright vise, aligning the piston seat housing exterior flats against the corresponding interior flats of the upright vise; (h) While the piston seat housing flats are so aligned, re-attaching the displacement rod to the piston packings and the piston seat housing and concealing the new piston packings, defining the same vertical annular space between the displacement rod and the cylindrical housing; (i) re-inserting the upper, wider cylindrical portion of the centering ring into and substantially filling the vertical annular space; (j) tightening the displacement rod to piston packing attachment; (k) inserting the displacement rod, new piston packings and piston seat housing back into the pump housing.

REFERENCE NUMERALS

Figure 1:
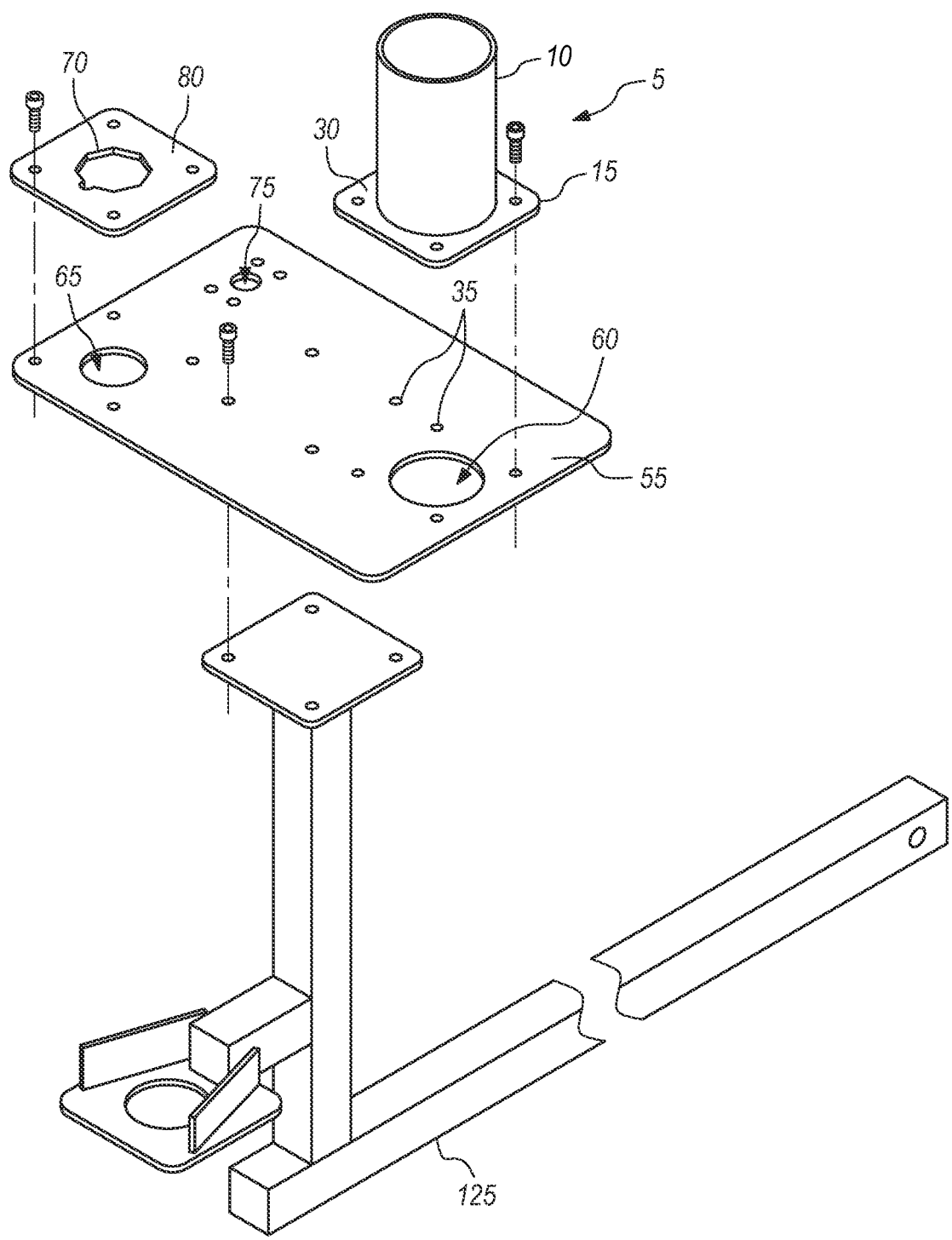
FIG. 1 shows an exploded perspective view of the upright vise, platform and second reinforcement piece positioned above a truck trailer hitch.

5 Upright vise
10 Hollow cylindrical column

15 First reinforcement piece
20 Interior flat
25 Annular lip
30 Flange
35 Fastener openings
40 Lower adaptor ring
45 Exterior flat
50 Upper centering ring
55 Platform
60 First circular opening
65 Second circular opening
70 Octagonal cutout
75 Third circular opening
80 Second reinforcement piece
85 Liquid paint displacement pump
90 Pump housing
95 Piston seat housing
100 Exterior flat
105 Displacement rod
110 Piston packings
115 Packing nut
120 Longitudinal cap screws (6 total)
125 Hitch assembly

DETAILED DESCRIPTION OF THE INVENTION

FIG. 1 shows an exploded perspective view of assembled upright vise 5, platform 55 and second reinforcement piece 80 positioned above a conventional truck trailer hitch. Platform 55 has three circular openings and sixteen fastener openings 35. Each of the three circular openings has a set of 4 fastener openings evenly spaced thereabout. Preferably, the platform is stainless steel ⅛ inch thick, 24 inches long and 12 inches across. Other dimensions are possible and contemplated within the scope of this invention.

The first circular opening 60 corresponds to and supports upright vise 5. The second 65 and third 75 circular openings correspond to and support the piston seat housing 95 of an assembled liquid paint displacement pump 85 (not shown in this view). I provide these two sizes of pump support openings because the piston seat housings, which sit in these openings, come in at least two different sizes. To recap, first circular opening 60 is strictly used to support the upright vise 5. Second 65 and third 75 circular openings are used to support an assembled pump while the technician separates the pump into its constituent components, some of which will ultimately be inserted into upright vise 5.

Upright vise 5 itself is mounted on a square first reinforcement piece 15, which is in turn mounted to platform 55. First reinforcement piece 15 has four fastener openings evenly spaced thereabout that correspond to and align with the four fastener openings around the first circular opening 60. Preferably, first reinforcement piece is made of ¼-inch-thick ultra-high strength steel, so that platform 55 can support 300 foot-pounds of force. Second reinforcement piece 80 also has four fastener openings evenly spaced thereabout. These correspond to and align with the four fastener openings around the second circular opening 65. An analogous third reinforcement piece (not shown) has a similar set of fastener openings that correspond to and align with the four fastener openings at the generally upper left corner of platform 55.

Fasteners (not numbered) secure each of the first reinforcement piece 15, the second reinforcement piece 80 and the third reinforcement piece to platform 55. Recall that these liquid paint displacement pumps weigh 80 pounds. Preferably, platform 55, first reinforcement piece 15 and the second reinforcement piece 80 are made from ultra-high strength steel. When the reinforcement pieces are mounted to the platform, that crates two layers of ultra-high strength steel. That is more than enough to securely support both an assembled pump 85 and the vise holding interior portions of the disassembled pump, in an upright position. There is a fourth set of 4 fastener openings in the geometric center of the platform to secure the platform to a support. In FIGS. 1-7, one example of support is a hitch assembly 125. This is a convenient and easy to assemble way of connecting platform 55 to the back of most pickup trucks. Other means for supporting platform 55 are possible and within the scope of this invention.

Hitch assembly 125 is dimensioned to be inserted into a conventional hitch receiver of a pickup truck, supporting platform 55 horizontally in the air so that platform 55 clears the truck's tailgate when the tailgate is lowered. Please see FIG. 2. Hitch assembly 125 generally comprises two components: a horizontal square tube called a post, and a corresponding vertical post mounted perpendicularly thereto and specifically dimensioned to support the upright vise subject of this application. Preferably, both posts are mild steel. Preferably, both posts are ¼ inch thick to sufficiently support the weight of an 80-pound displacement pump, yet light enough for a person to carry.

The horizontal post is at least 32 inches long, so that when it is inserted into the hitch receiver, it extends sufficiently beyond the lowered tailgate so that platform 55, when attached thereto, will not touch the lowered tailgate. The lowered tailgate becomes in this way an extra work surface for the technician to put in place his tools and the various parts of this invention.

The horizontal post has a proximal end that inserts into a conventional pickup truck receiver hitch, and an opposing distal end. About 5 inches in from the proximal end, there is a 5 mm hole through the 2-inch width of the horizontal post. This provides means to insert a pin and lock the horizontal post into the receiver hitch. The distal end of the horizontal post connects in turn to a lower end of the vertical post (not numbered).

Attached to an opposing upper end of the vertical post is a base (not numbered) that holds platform 55. Ideally, the base is a 5.5-inch square that is 1.4-inch thick. The base further has 4 10 mm holes tapped and spaced 1 inch from each corner. These holes align with the centermost set of 4 holes in platform 55. The base supports platform 55 from below and is fastened thereto with fasteners of choice. This entire hitch assembly stabilizes platform 55 in a horizontal position and supports the weight of an 80-pound displacement pump set upright thereinto.

Roughly 6 inches up from the lower end of the vertical post is a protruding push plate with a circular cutout larger than the diameter of displacement rod 105 and smaller than housing 90. Please see FIG. 5. A conventional vehicle jack supports the displacement rod 105 from below and pushes it upward through the circular cutout. Housing 90 is too large to pass through the circular cutout. In this way, the technician can extract rod 105 from within the cylindrical housing 90.

Figure 2:
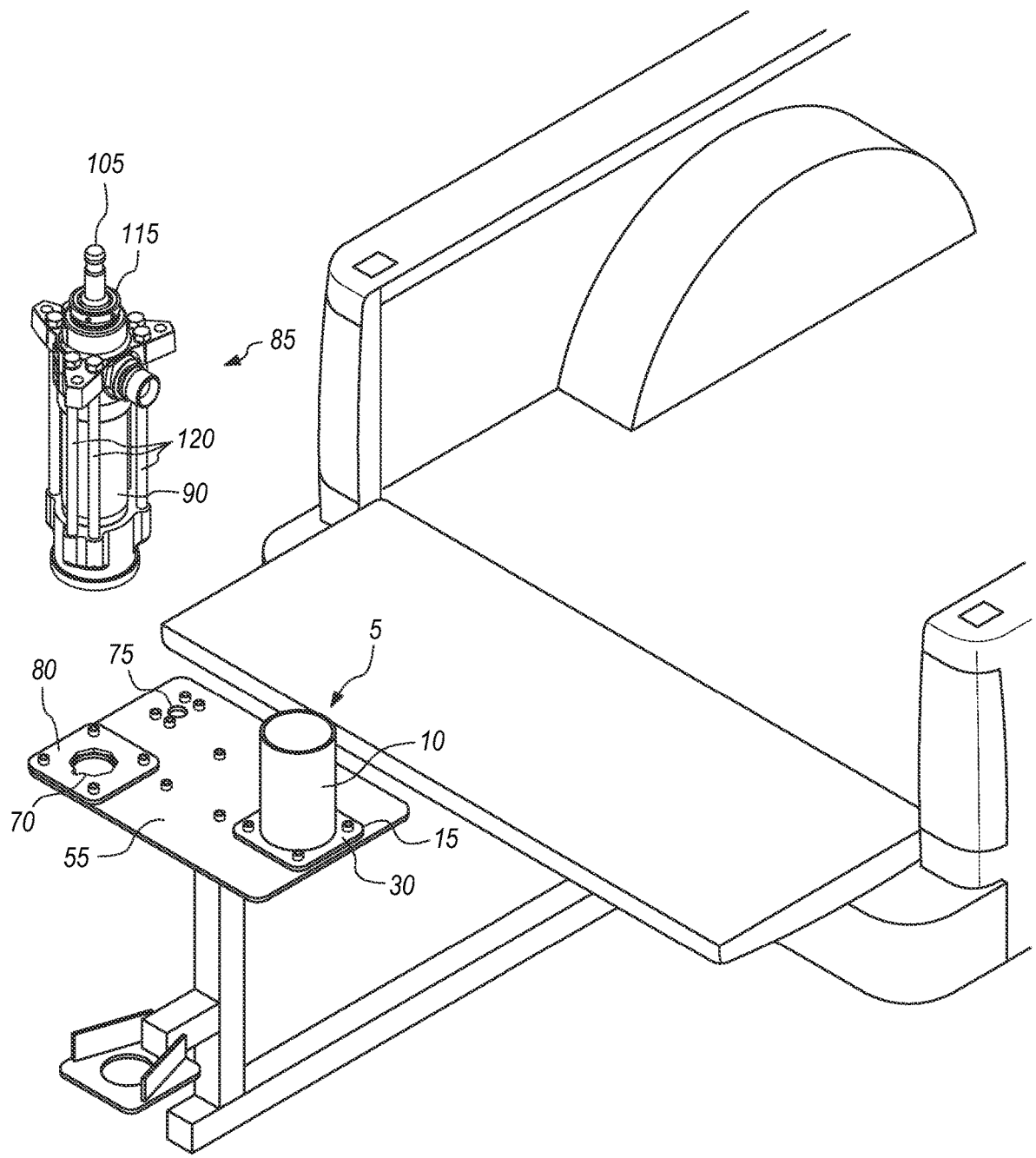
FIG. 2 shows a perspective view of an assembled pump positioned above the platform and upright vise and alongside a truck with trailer hitch.
Figure 3:
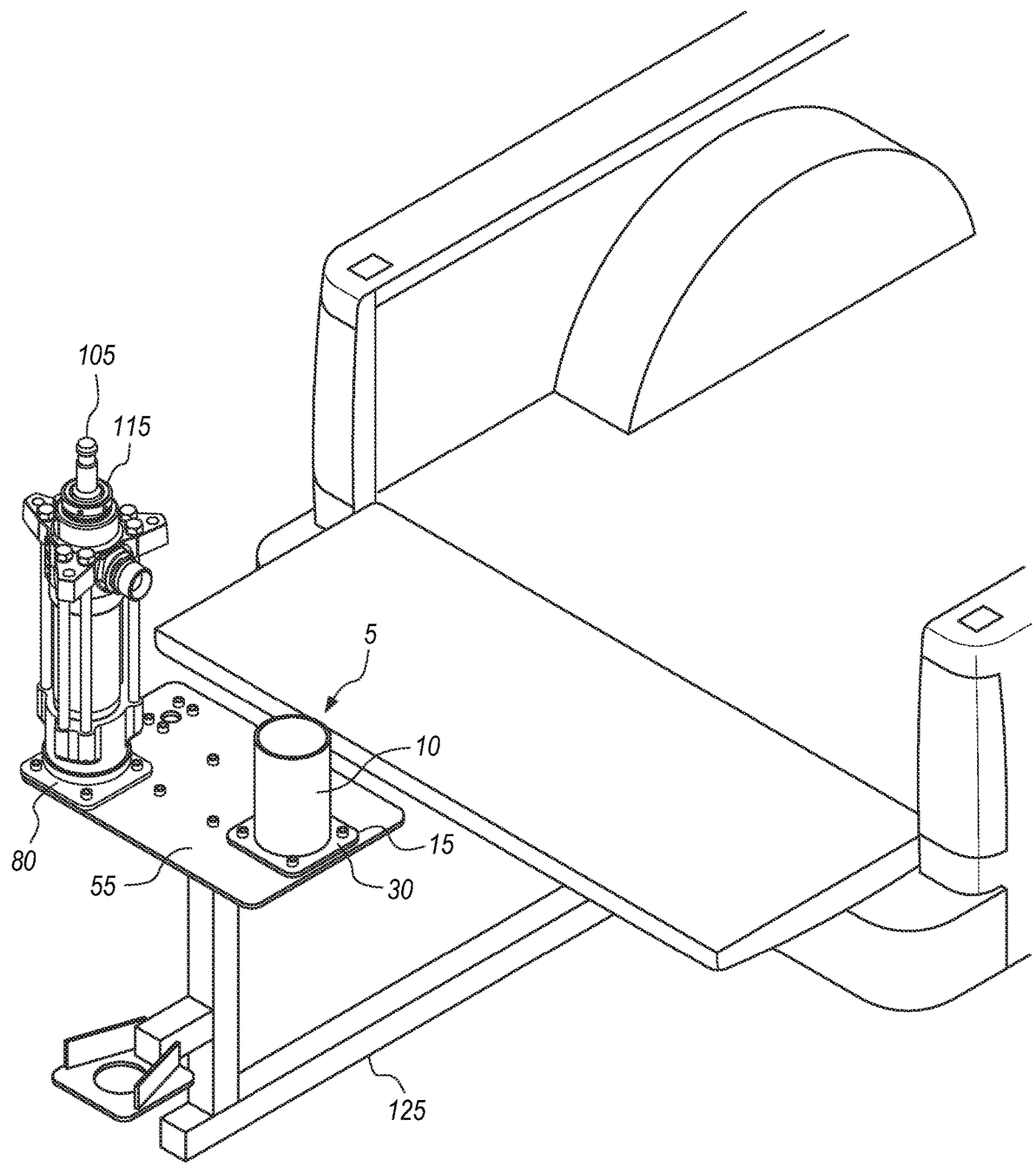
FIG. 3 shows a perspective view of an assembled pump inserted into the second circular opening of the platform.
Figure 4:
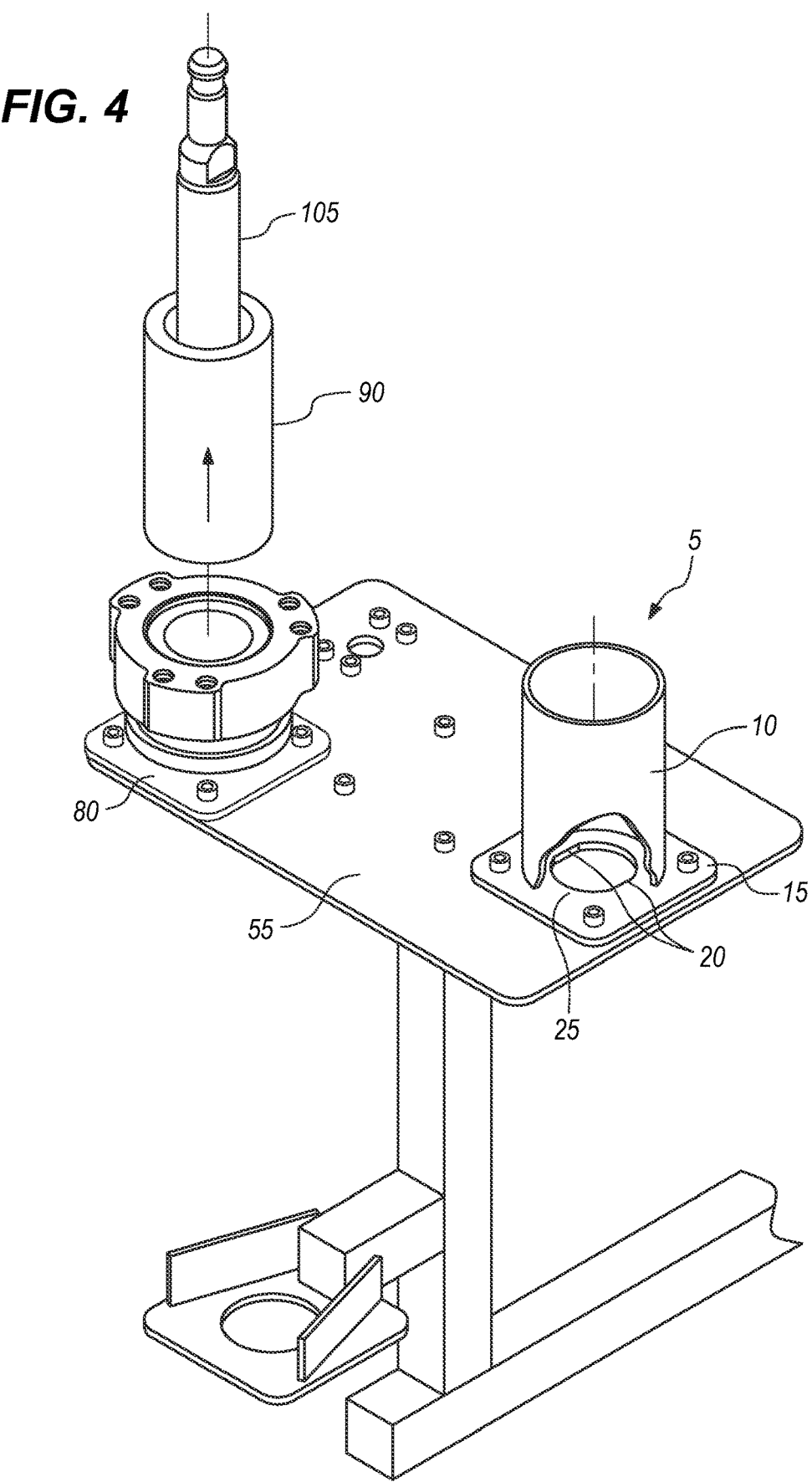
FIG. 4 shows a perspective view of a pump housing and displacement rod being separated from the bottom of the pump. The piston seat housing and piston packings are still attached to the displacement rod but are not visible, as they are still contained within the piston seat housing.

FIGS. 2-4 show a perspective view of an assembled pump positioned above the platform and upright vise and alongside a truck with trailer hitch. The damaged piston packings are ensconced deep within the housing of assembled pump, and not visible in this view. The technician must remove all outer parts from the pump to extract the piston packings. Broadly speaking the pump has three outer parts. On the bottom of the pump is piston seat housing 95 (not shown in this view). On the top of the pump is packing nut 115. Six longitudinal cap screws 120 clamp packing nut 115 against piston seat housing 95, forming a sort of cage around the pump. The first step to extract the damaged piston packing is to remove this cage.

The bottom of most, but not all, piston seat housings has a camlock (not shown) shaped like an octagon. The second reinforcement piece 80 has an octagonal cutout 70 and four fastener openings. Second reinforcement piece 80 is attached to the platform through these fastener openings, aligned with second circular opening 65. This creates an octagonal key onto which the piston seat camlock can lock. Some pumps do not have an octagonal camlock. If they have another flange, this can usually also lock into the octagonal cutout 70.

Most preferably, the second reinforcement piece 80 is ¼-inch-thick ultra-high strength steel. Preferably, second reinforcement piece 80 is a 6×6-inch square. When second reinforcement piece 80 is attached to platform 55, this creates two layers of ultra-high strength steel. These two layers together are strong enough to support and stabilize the weight of an upright 80-pound pump. The technician can lock the pump upright in this key and use an ordinary wrench, or a motorized wrench, to remove all 6 cap screws 120. With the cap screws out of the way, the technician can lift the packing nut out of the way. This releases cylindrical housing 90 and displacement rod 105, for now, still attached to each other.

Figure 5:
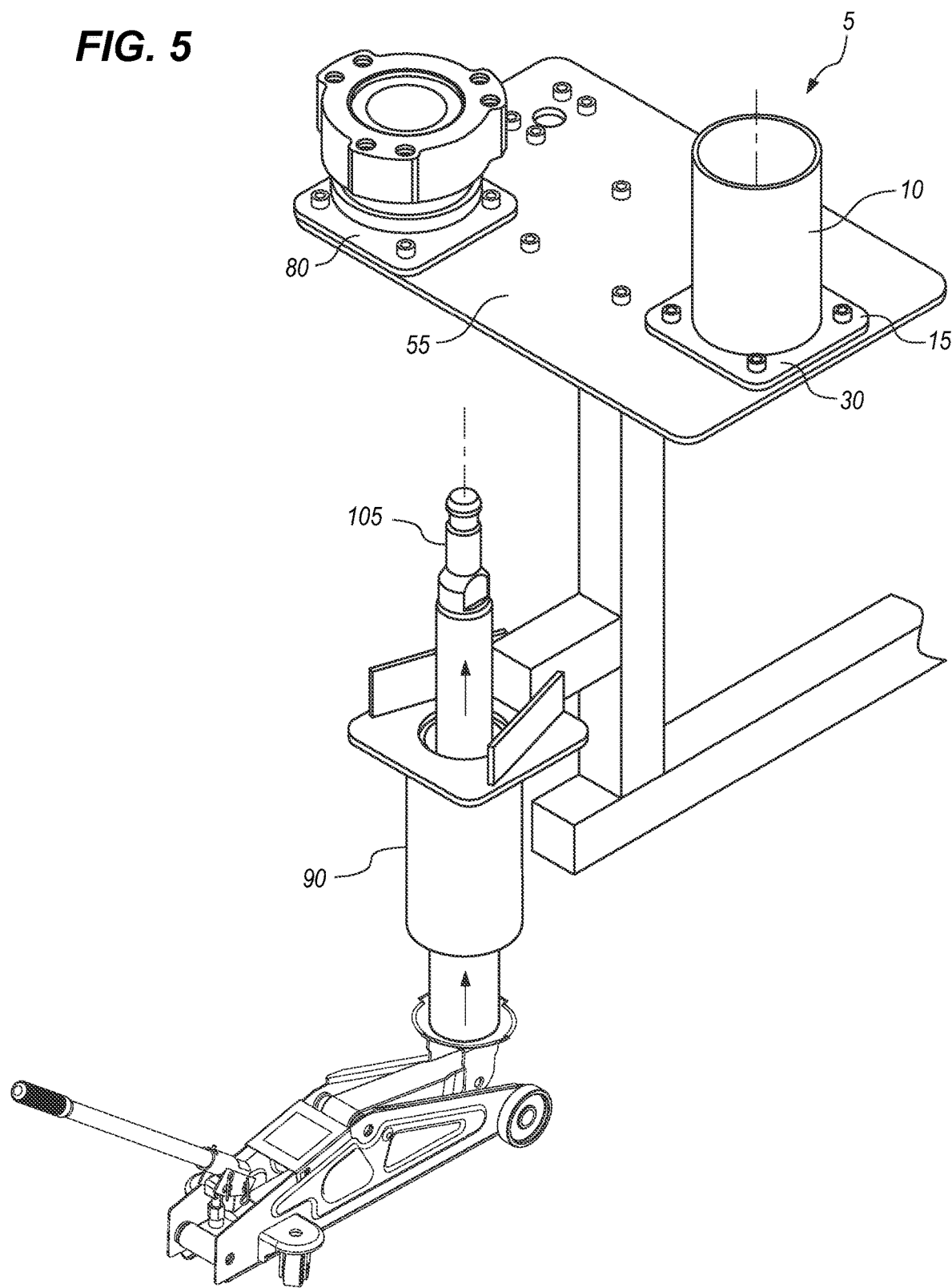
FIG. 5 shows a perspective view of a conventional jack pushing from beneath the platform: the displacement rod, piston seat housing and piston packings through the piston seat housing, thereby separating the piston seat housing from these inner parts.

FIG. 5 shows the next step in the extraction process, separating the displacement rod 105 from cylindrical housing 90. In general, an ordinary vehicle jack positioned underneath platform 55 and hitch assembly 125 pushes displacement rod 105 up and through cylindrical housing 90. Displacement rod 105 and piston packings 95 are now free from within housing 90.

Figure 6:
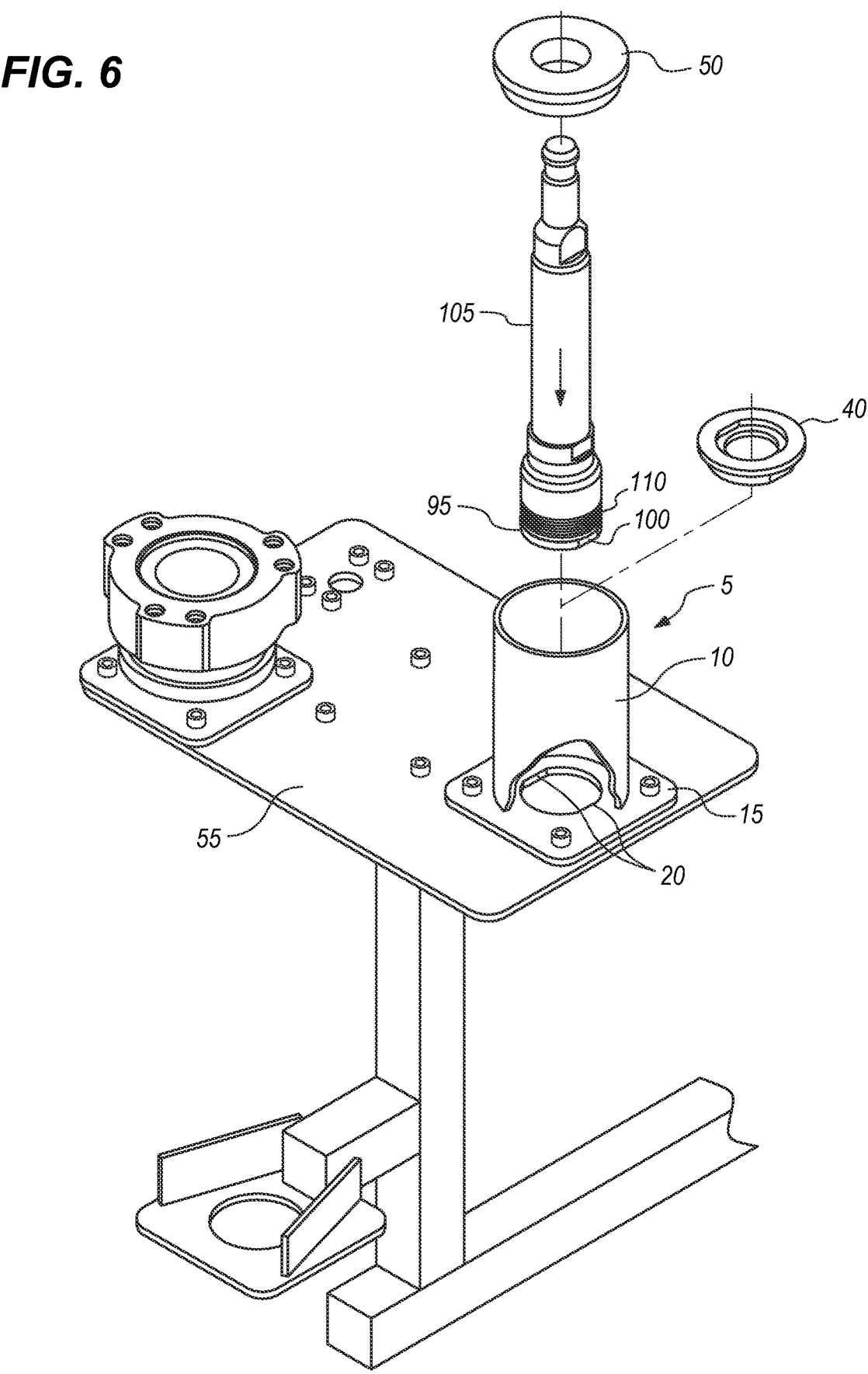
FIG. 6 shows a perspective and exploded view of the piston seat housing, displacement rod, optional lower adaptor ring and upper centering ring being inserted into the upright vise.

Next is where the upright vise 5 comes in. Displacement rods 105 are screwed into piston seat housings 95. Upright vise 5 rotationally locks piston seat housing so that the technician can apply force to unscrew these parts. FIG. 6 shows details of separating displacement rod 105 from damaged piston packings 95. With packing nut 115, cap screws 120 and housing 90 all removed, you can clearly see rod 105 still attached to piston seat housing 95 and piston packings 110.

Upright vise 5 comprises a rigid and hollow cylindrical column 10 attached to first reinforcement piece 15, which is in turn attached to platform 55. Preferably, cylindrical column 10 is ¼ inch and 7.5 inches tall. Most preferably, cylindrical column is mild steel. First reinforcement piece 15 has a central opening further defined by two diametrically opposed interior flats 20, the first circular opening being smaller than a lower opening of the cylindrical column, the reinforcement piece mounted beneath and centered about the lower opening of the cylindrical column 10. This creates an annular lip facing the interior space of cylindrical column 10. The technician inserts the attached displacement rod 105, piston packings 110 and piston seat housing 95 into the upright vise, with the piston seat housing facing the first circular opening 60. This creates a vertical annular space between displacement rod 105 and cylindrical column 10.

Piston seat housing 95 has diametrically opposed exterior flats 100. These piston seat housings 95 come in a large and small size. Interior flats 20 are dimensioned to precisely mate with and align with exterior flats 100 of large piston seat housings 95, locking the piston seat housing thereinto.

Figure 8:
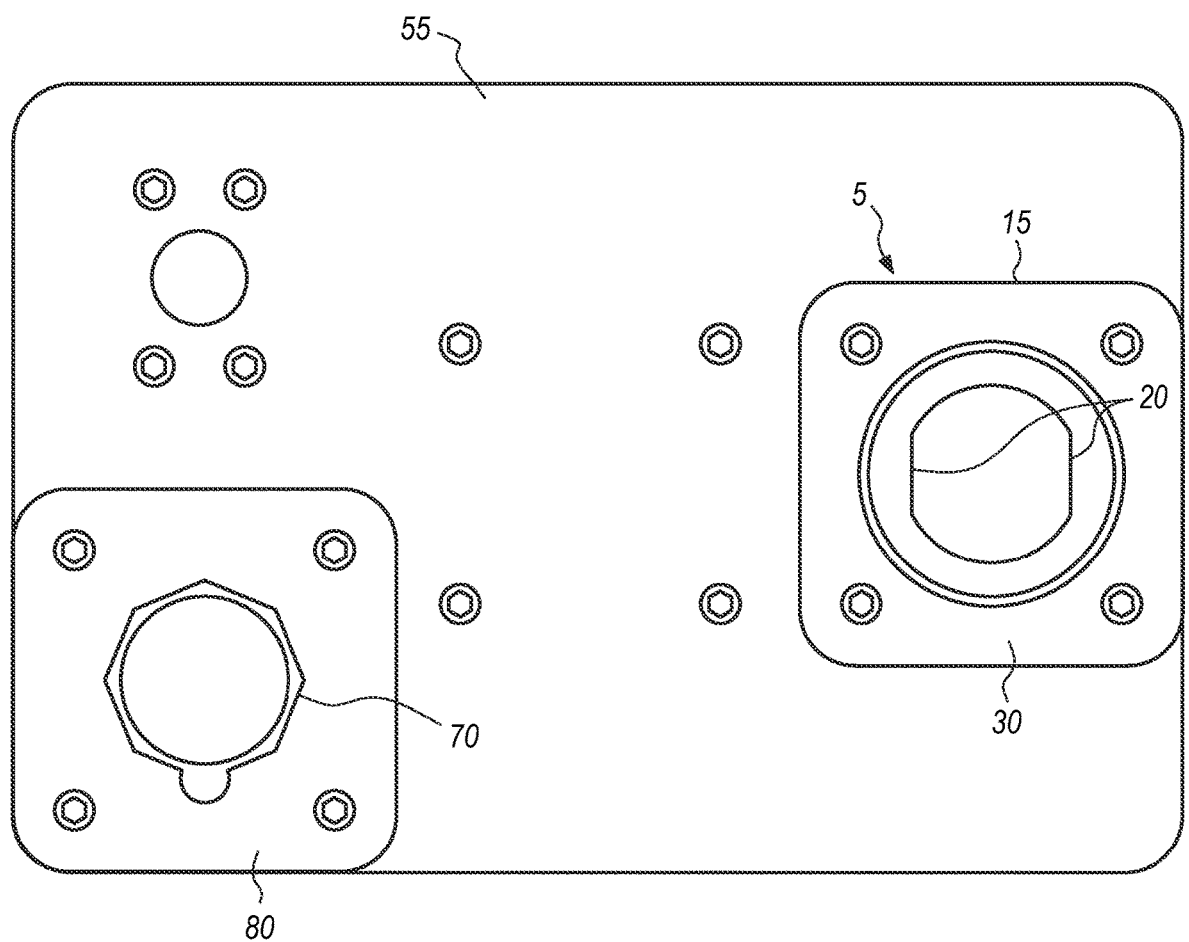
FIG. 8 shows a perspective view of the piston seat housing, displacement rod and upper centering ring inserted into the upright vise. The optional lower adaptor ring may be present but would not be visible in this view.

Because these pumps come in different sizes, not all of them automatically fit into the upright vise as-is. As an example, the Graco company makes a model 2400, and a proportionally smaller model 1800. For this reason, I created lower adaptor rings 40 that can optionally be inserted to adapt interior flats 20 to mate with exterior flats 100 of smaller piston seat housings 95, as in the Graco model 1800. Most preferably, lower adaptor rings 40 are made of ultra-high strength steel. Other materials are possible, as long as they can withstand the force of up to 300 foot-pounds of force required to unscrew displacement rod 105 from piston packings 95. For clarity and simplicity, only one size of lower adaptor ring 40 is shown. FIG. 8 is a close-up top view of an empty upright vise 5, to show the details of interior flats 20 more clearly.

At this point, there is still a vertical annular space between displacement rod 105. Piston seat housing 95 is locked into place but if the technician were to apply rotational force at this point, displacement rod 105 would jostle about, wasting energy and possibly damaging the parts. Upper centering ring 50 is dropped into and fills the vertical annular space, stabilizing displacement rod 105. For clarity and simplicity, I show only one size of upper centering ring 50 in FIG. 6. In practice, there are multiple sizes of upper centering rings 50. This is because there are multiple sizes of displacement pumps. As we may need to adapt the piston packings 95 to lock into the vise, we may also need to adapt the corresponding vertical annular space depending on the size of the pump. One upper centering ring 50 is dimensioned to support and surround the Graco model 2400 displacement rod 105. Another is dimensioned to support and surround the Graco model 1800 displacement rod 105. Most preferably, upper centering ring 50 is made from 6061 aluminum and is 3 inches across. Other dimensions and materials are possible while still within the scope of this invention.

Figure 7:
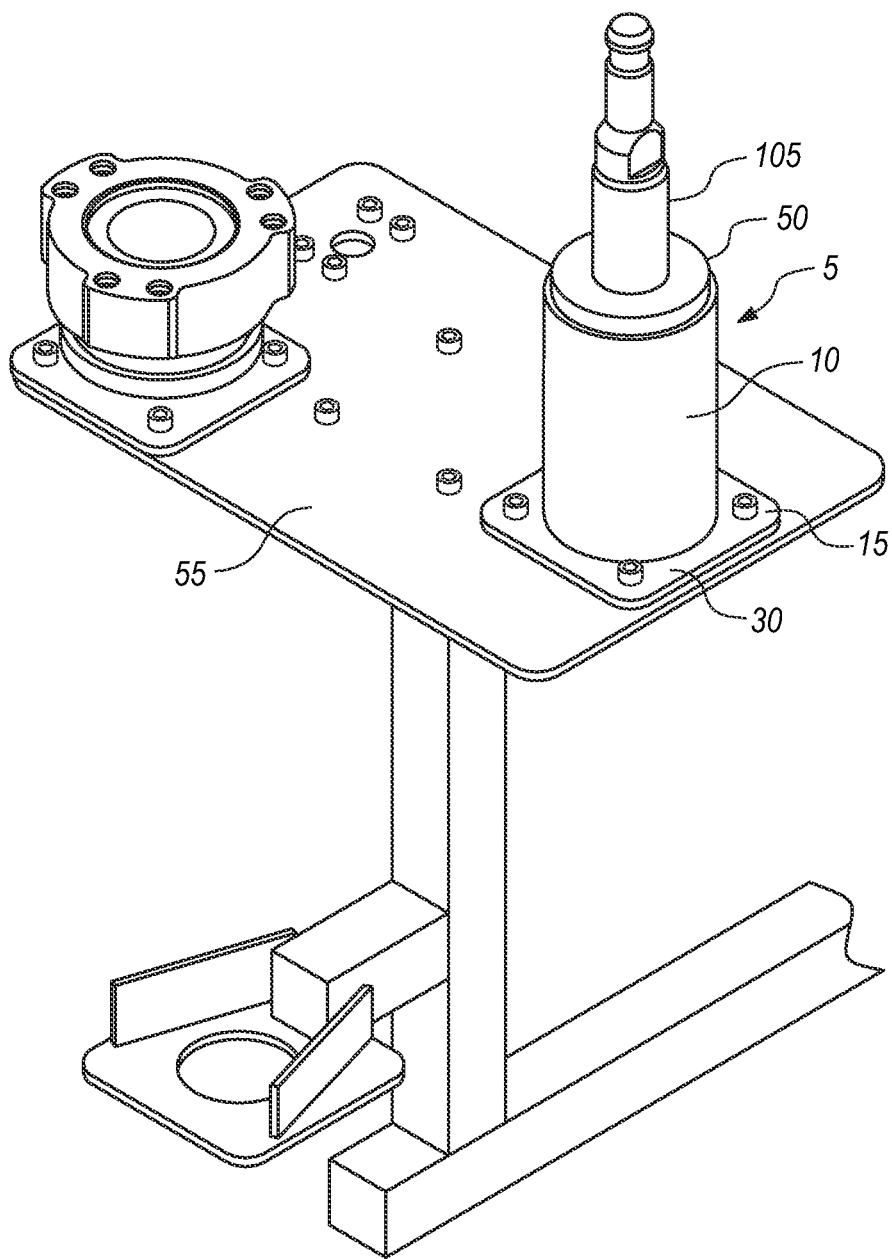
FIG. 7 shows a top view of an empty upright vise.

FIG. 7 shows displacement rod 105 and piston seat housing 95 correctly inserted into upright vise 5. Now the technician can correctly apply torque and unscrew displacement rod 105 from piston seat housing 95. Unscrewing these two parts loosens and releases and individual piston packings 110. Please see FIG. 9.

Figure 9:
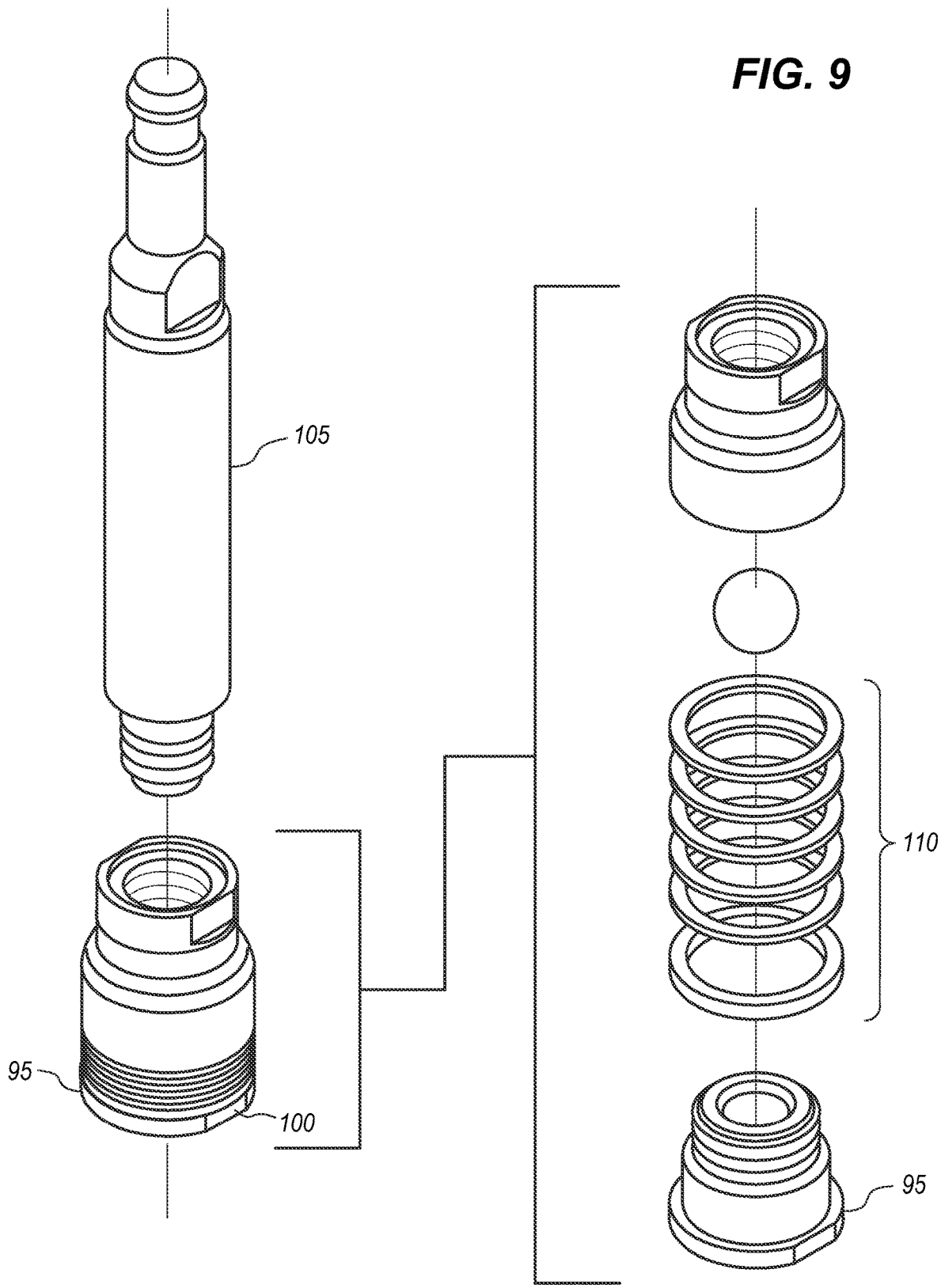
FIG. 9 shows an exploded view of the displacement rod, piston seat housing and piston packing rings.

FIG. 9 further shows the technician lifting displacement rod 105 out of upright vise 5, isolating, and then removing damaged piston packings 110. The process is reversed to rebuild the pump. The technician inserts new piston packings into the piston seat housing, pushes new piston packings further into the piston seat housing to expose the exterior flats of the piston seat housing, inserts the new piston packings and piston seat housing back into the upright vise 5, aligning the piston seat housing exterior flats against the corresponding interior flats of upright vise 5. While the piston seat housing flats are so aligned, he re-attaches displacement rod 105 to the piston packings and the piston seat housing, concealing new piston packings within displacement rod 105. This re-creates the same vertical annular space between the displacement rod and the cylindrical housing. He re-inserts the upper, wider cylindrical portion of the centering ring into and substantially filling the vertical annular space. He screws the displacement rod back onto piston packing, inserts the displacement rod, new piston packings and piston housing back into the pump housing, and closes the housing with the longitudinal cap screws 120.

Although embodiments and examples of the invention have been shown and described, it is to be understood that various modifications, substitutions, and rearrangements of parts, components, steps, as well as other uses, shapes,

I claim:

1. An upright vise, comprising:
   a. a rigid hollow cylindrical column having an interior diameter, defining an interior space, and having an upper opening, and a lower opening;
   b. a rigid and flat first reinforcement piece with a central circular opening further defined by two diametrically opposed interior flats, the central circular opening being smaller than the lower opening of the cylindrical column, the reinforcement piece mounted beneath and centered about the lower opening of the cylindrical column, thereby creating an annular lip facing the interior space of the cylindrical column, and a flange extending away from the cylindrical column, the flange further comprising a first plurality of fastener openings evenly spaced around the central circular opening;
   c. an upper centering ring comprising an upper, wider, hollow cylinder having an interior diameter and defining an interior space, centrally mounted to a lower, narrower hollow cylinder of an equal interior diameter;
   d. a rigid platform having:
      i. a first circular opening and a plurality of fastener opening evenly spaced therearound and aligned with the first plurality of fastener openings;
      ii. a second circular opening reinforced with a second reinforcement piece and further defined by a central octagonal cutout larger than the second circular opening, and a second group of fastener openings evenly spaced around the octagonal cutout;
      iii. a third circular opening smaller than both the first circular opening and the second circular opening and a third group of fastener openings spaced therearound; and
   e. fasteners to fasten the flange to the platform.

2. The upright vise of claim 1, further comprising at least one lower adaptor ring dimensioned to fit inside the hollow cylindrical column and having two diametrically opposed exterior flats dimensioned to mate with the two diametrically opposed interior flats of the hollow cylindrical column carved out from a bottom portion thereof.

3. A method of repairing damaged piston packings of a liquid paint displacement pump having a cylindrical housing and a piston seat housing with diametrically opposed exterior flats, comprising the steps of:
   providing the vice of claim 1;
   a. Extracting from within the cylindrical housing a displacement rod, which is attached to the damaged piston packings, which is in turn attached to the piston seat housing;
   b. Separating the displacement rod from the damaged piston packings and the piston seat housing, thereby exposing the damaged piston packings, the separating step further comprising:
   i. Inserting the attached displacement rod, piston packings and piston seat housing into the upright vise so that the piston seat housing exterior flats face the smaller central circular opening and the displacement rod points away from the vise, thereby defining a vertical annular space between the displacement rod and the cylindrical housing of the pump;
   ii. Aligning the piston seat housing exterior flats against corresponding interior flats of the two diametrically opposed interior flats, thereby locking the piston packings and piston seat housing assembly within the upright vise;
   iii. Inserting the centering ring into and substantially filling the vertical annular space;
   iv. While the piston seat housing flats are aligned and the centering ring inserted into the vertical annular space, unscrewing the displacement rod from the piston packings and the piston seat housing;
   v. Lifting the displacement rod out from within the vise;
   c. Removing the damaged piston packings and the piston seat housing from within the vise;
   d. Removing the damaged piston packings from within the piston seat housing;
   e. Inserting new piston packings into the piston seat housing;
   f. Pushing the new piston packings further into the piston seat housing to expose the exterior flats of the piston seat housing;
   g. Inserting the new piston packings and the piston seat housing back into the vise, aligning the piston seat housing exterior flats against the corresponding interior flats of the two diametrically opposed interior flats;
   h. While the piston seat housing flats are so aligned, re-attaching the displacement rod to the new piston packings and the piston seat housing and concealing the new piston packings;
   i. Re-inserting the centering ring into and substantially filling the vertical annular space;
   j. Tightening the displacement rod to the new piston packing attachment; and
   k. Inserting the displacement rod, new piston packings and piston housing back into the pump housing.

\* \* \* \* \*